(12) United States Patent
Hellstrom et al.

(10) Patent No.: US 9,228,527 B2
(45) Date of Patent: Jan. 5, 2016

(54) DYNAMIC ESTIMATOR FOR DETERMINING OPERATING CONDITIONS IN AN INTERNAL COMBUSTION ENGINE

(71) Applicant: Robert Bosch GmbH, Stuttgart (DE)

(72) Inventors: Erik Hellstrom, Ann Arbor, MI (US); Anna Stefanopoulou, Ann Arbor, MI (US); Li Jiang, Ann Arbor, MI (US); Jacob Larimore, Ann Arbor, MI (US)

( * ) Notice: Subject to any disclaimer, the term of this patent is extended or adjusted under 35 U.S.C. 154(b) by 381 days.

(21) Appl. No.: 13/621,527

(22) Filed: Sep. 17, 2012

(65) Prior Publication Data

US 2013/0073173 A1 Mar. 21, 2013

Related U.S. Application Data

(60) Provisional application No. 61/535,122, filed on Sep. 15, 2011, provisional application No. 61/543,544, filed on Oct. 5, 2011.

(51) Int. Cl.
*F02D 41/30* (2006.01)
*F02D 41/40* (2006.01)
*F02D 13/02* (2006.01)
*F02D 35/02* (2006.01)
(Continued)

(52) U.S. Cl.
CPC ........ *F02D 41/3035* (2013.01); *F02D 13/0265* (2013.01); *F02D 35/024* (2013.01); *F02D 35/028* (2013.01); *F02D 41/40* (2013.01); *F02B 1/12* (2013.01); *F02D 2041/1432* (2013.01); *F02D 2200/0616* (2013.01); *Y02T 10/128* (2013.01); *Y02T 10/18* (2013.01); *Y02T 10/44* (2013.01)

(58) Field of Classification Search
CPC ................ F02P 15/006; F01L 13/0015; F01L 2013/0015
USPC ............................ 701/59, 101, 102, 103, 115
See application file for complete search history.

(56) References Cited

U.S. PATENT DOCUMENTS 5,921,221 A * 7/1999 Davis et al. ................... 123/436
6,085,143 A * 7/2000 Przymusinski et al. ...... 701/110
(Continued)

OTHER PUBLICATIONS

Daw et al., "Observing and modeling nonlinear dynamics in an internal combustion engine," Phys. Rev. E, 57(3): 2811-2819, 1998.
(Continued)

*Primary Examiner* — Stephen K Cronin
*Assistant Examiner* — Susan E Scharpf
(74) *Attorney, Agent, or Firm* — Michael Best & Friedrich LLP

(57) ABSTRACT

Methods and systems are provided for estimating engine performance information for a combustion cycle of an internal combustion engine. Estimated performance information for a previous combustion cycle is retrieved from memory. The estimated performance information includes an estimated value of at least one engine performance variable. Actuator settings applied to engine actuators are also received. The performance information for the current combustion cycle is then estimated based, at least in part, on the estimated performance information for the previous combustion cycle and the actuator settings applied during the previous combustion cycle. The estimated performance information for the current combustion cycle is then stored to the memory to be used in estimating performance information for a subsequent combustion cycle.

13 Claims, 6 Drawing Sheets

(51) Int. Cl.
  *F02B 1/12* (2006.01)
  *F02D 41/14* (2006.01)

(56) References Cited

U.S. PATENT DOCUMENTS

| | | | | |
|---|---|---|---|---|
| 6,276,334 | B1* | 8/2001 | Flynn et al. | 123/435 |
| 6,748,928 | B2* | 6/2004 | Shingole | 123/480 |
| 6,801,847 | B2* | 10/2004 | Jaliwala et al. | 701/104 |
| 6,876,919 | B2* | 4/2005 | James et al. | 701/111 |
| 7,167,789 | B1* | 1/2007 | Froloff et al. | 701/101 |
| 7,184,877 | B1* | 2/2007 | de Ojeda | 701/104 |
| 7,357,103 | B2 | 4/2008 | Koopmans | |
| 7,370,616 | B2 | 5/2008 | Kuo et al. | |
| 7,431,011 | B2* | 10/2008 | Wagner et al. | 123/299 |
| 7,467,040 | B2* | 12/2008 | Ker et al. | 701/102 |
| 7,469,181 | B2 | 12/2008 | Duffy et al. | |
| 7,810,478 | B2 | 10/2010 | Petridis et al. | |
| 7,899,601 | B2 | 3/2011 | Yun et al. | |
| 8,190,307 | B2* | 5/2012 | Omar | 701/4 |
| 2008/0178843 | A1 | 7/2008 | Duffy et al. | |
| 2009/0229563 | A1 | 9/2009 | Rayl et al. | |
| 2009/0274465 | A1 | 11/2009 | Bandyopadhyay | |
| 2009/0306866 | A1* | 12/2009 | Malikopoulos | 701/59 |
| 2010/0162991 | A1 | 7/2010 | Ramappan et al. | |
| 2010/0275860 | A1* | 11/2010 | Subbotin et al. | 123/21 |
| 2011/0270505 | A1 | 11/2011 | Chaturvedi et al. | |
| 2012/0253634 | A1* | 10/2012 | Jiang et al. | 701/102 |

OTHER PUBLICATIONS

Daw et al., "Modeling cyclic variability in spark-assisted HCCI," Journal of Engineering for Gas Turbines and Power, 130(5): 052801-1-052801-6, 2008.

Davis et al., "Controlling cyclic combustion variations in lean-fueled spark-ignition engines," in SAE World Congress, Detroit, MI, USA, SAE 2001-01-0257.

Koopmans et al., "Demonstrating a SI-HCCI-SI mode change on a Volvo 5-cylinder electronic valve control engine," in SAE World Congress, Detroit, MI, USA, 2003, SAE 2003-01-0753.

Wagner et al., "On the nature of cyclic dispersion in spark assisted HCCI combustion," In SAE World Congress, Detroit, MI, USA, 2006, SAE 2006-01-0418.

Hellstrom et al., "Modeling cyclic variability in lean controlled-autoignition engines," Submitted to 50th IEEE Conference on Decision and Control, Dec. 12-15, 2011, Orlando Florida.

Hellstrom et al. "Understanding the dynamic evolution of cyclic variability at the operating limits of HCCI engines with negative valve overlap," To be Submitted to 2012 SAE World Congress, Apr. 23-26, Detroit Michigan.

Larimore et al., "Experiments and Analysis of High Cyclic Variability at the Operational Limits of Spark-Assisted HCCI Combustion," Draft compiled Aug. 31, 2011.

Hellstrom et al., "Quantifying cyclic variability in a multi-cylinder HCCI engine with high residuals," ASME 2012 Internal Combustion Engine Division Spring Technical Conference, Torino, Piemonte, Italy, May 6-9, 2012.

U.S. Appl. No. 13/621,539, filed Sep. 17, 2012.
U.S. Appl. No. 13/621,433, filed Sep. 17, 2012.
U.S. Appl. No. 13/621,425, filed Sep. 17, 2012.

Hellstrom, E. and Stefanopoulou, A. G., "Modeling cyclic dispersion in autoignition combustion," In Proceedings of the 50th IEEE Conference on Decision and Control, Dec. 12-15, 2011, pp. 6834-6839, Orlando, FL, USA.

Chiang, C. J., Stefanopoulou, A. G., and Jankovic, M., "Nonlinear observer-based control of load transitions in homogeneous charge compression ignition engines," IEEE Transactions on Control Systems Technology, May 2007, pp. 438-448, 15(3).

Chiang, C. J. and Stefanopoulou, A. G., "Stability analysis in homogeneous charge compression ignition (hcci) engines with high dilution," IEEE Transactions on Control Systems Technology, Mar. 2007, pp. 209-219, 15(2).

Chiang, C. J. and Stefanopoulou, A. G., "Control of thermal ignition in gasoline engines," In Proceedings of the American Control Conference, Jun. 2005, pp. 3847-3852, vol. 6.

Chiang, C. J. and Stefanopoulou, A. G., "Steady-state multiplicity and stability of thermal equilibria in homogeneous charge compression ignition (hcci) engines," In Proceedings of the 43rd IEEE Conference on Decision and Control, Dec. 2004, pp. 1676-1681, vol. 2.

Rausen, D. J., Stefanopoulou, A. G., Kang, J. M., Eng, J. A., and Kuo, T. W., "A mean-value model for control of homogeneous charge compression ignition (hcci) engines," Transactions of the ASME, Journal of Dynamic Systems, Measurement and Control, Sep. 2005, pp. 355-362, 3(3).

Rausen, D. J., Stefanopoulou, A. G., Kang, J. M., Eng, J. A., and Kuo, T. W., "A mean-value model for control of homogeneous charge compression ignition (hcci) engines," In Proceedings of the American Control Conference, Jul. 2004, pp. 125-131, vol. 1.

Daw, C. S., Kennel, M. B., Finney, C. E. A., and Connolly, F. T., "Observing and modeling nonlinear dynamics in internal an internal combustion engine," Phys. Rev. E, 1998, pp. 2811-2819, vol. 57, No. 3.

Davis, L. I., Jr., Feldkamp, L. A., Hoard, J. W., Yuan, F., Connolly, F. T., Daw, C. S., and Green, J. B., Jr., "Controlling cyclic combustion variations in lean-fueled spark-ignition engines," In SAE World Congress, 2001, SAE 2001-01-0257, 9 pages.

* cited by examiner

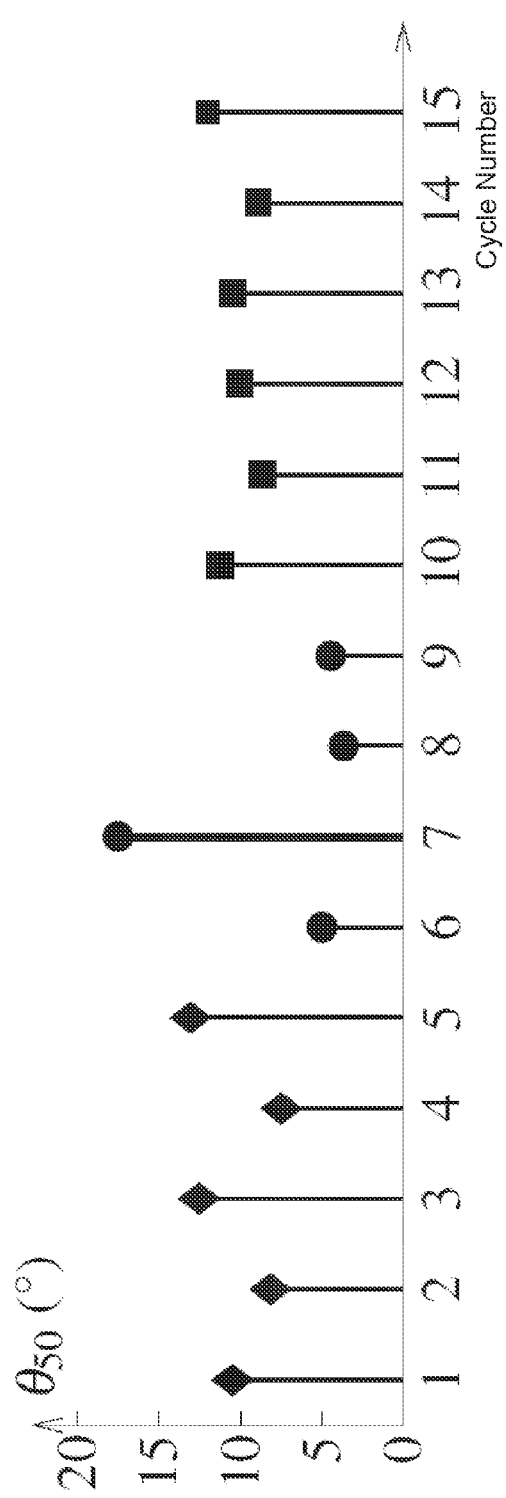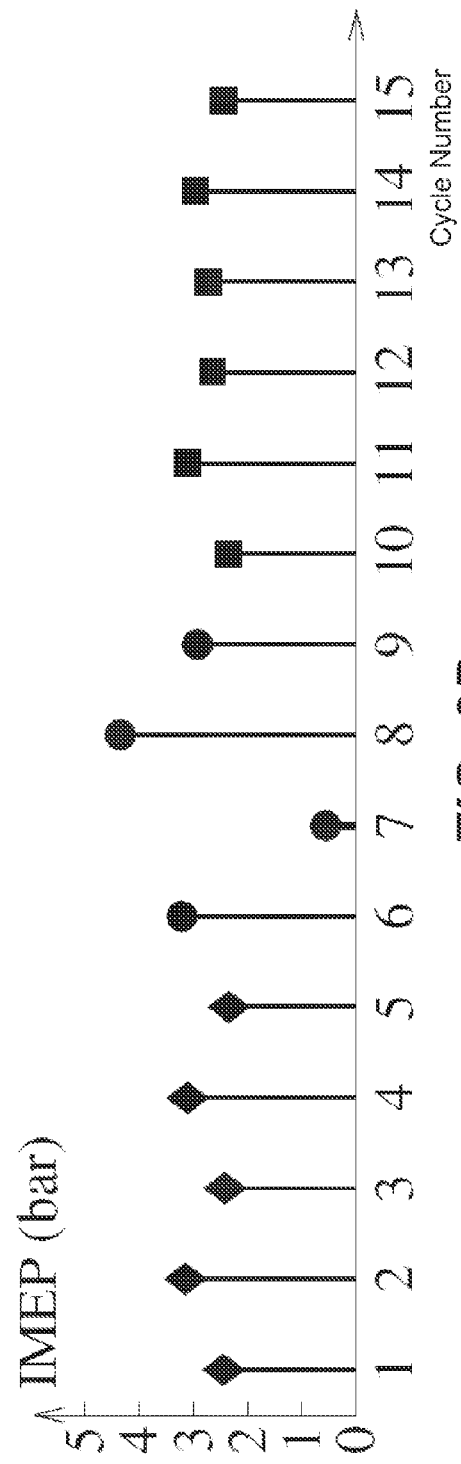

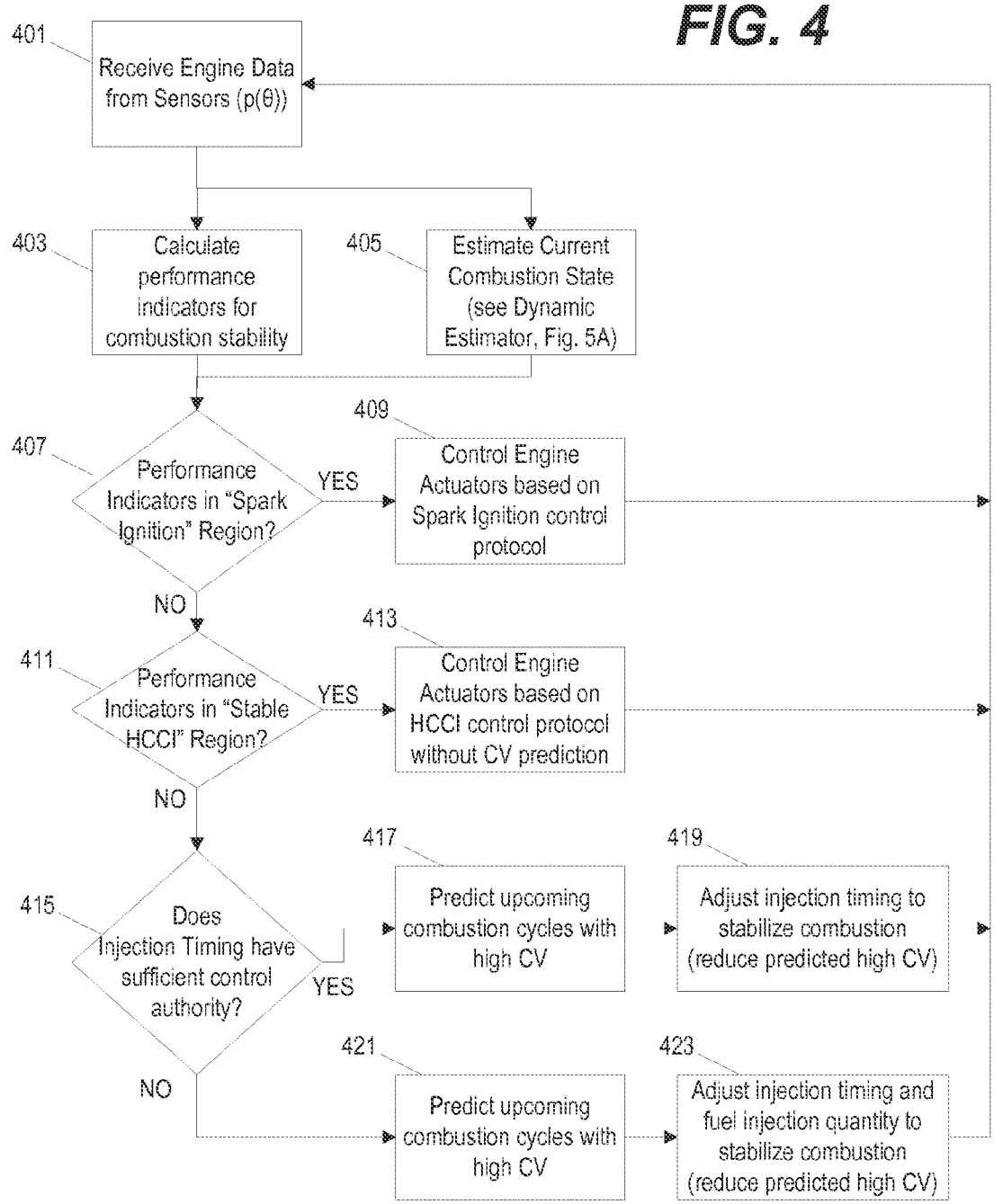

DYNAMIC ESTIMATOR FOR DETERMINING OPERATING CONDITIONS IN AN INTERNAL COMBUSTION ENGINE

CROSS-REFERENCE TO RELATED APPLICATIONS

This application claims priority to U.S. Provisional Application No. 61/535,122, filed Sep. 15, 2011, titled "METHOD FOR MODELING CYCLIC VARIABILITY IN LEAN CONTROLLED-AUTOIGNITION ENGINES" and U.S. Provisional Application No. 61/543,544, filed Oct. 5, 2011, titled "FUELING STRATEGIES FOR CONTROLLED-AUTOIGNITION ENGINES," the entirety of both of which are incorporated herein by reference.

STATEMENT REGARDING FEDERALLY SPONSORED RESEARCH OR DEVELOPMENT

This invention was made with Government support under grant No. DE-EE0003533 awarded by the Department of Energy. The Government has certain rights in this invention.

BACKGROUND

The present invention relates to systems for controlling and optimizing the operation of an internal combustion engine. In particular, the present invention relates to methods of improving operation of an internal combustion engine operating in a controlled autoignition (or HCCI) combustion mode.

SUMMARY

In one embodiment, the invention provides a method of estimating engine performance information for a combustion cycle of an internal combustion engine. Estimated performance information for a previous combustion cycle is retrieved from memory. The estimated performance information includes an estimated value of at least one engine performance variable. Actuator settings applied to engine actuators are also received. The performance information for the current combustion cycle is then estimated based, at least in part, on the estimated performance information for the previous combustion cycle and the actuator settings applied during the previous combustion cycle. The estimated performance information for the current combustion cycle is then stored to the memory to be used in estimating performance information for a subsequent combustion cycle.

In some embodiments, the estimated performance information is filtered before being stored to the memory. The estimated performance information is filtered by measuring one of the estimated performance variables using an engine sensor and filtering the estimated performance information based, at least in part, on the difference between the estimated value of the performance variable and the measured value of the same performance variable.

In another embodiment, the invention provides a method of estimating performance information for a current combustion cycle of an internal combustion engine. Estimated performance information for an immediately previous combustion cycle is retrieved from a memory. The estimated performance information includes an estimated temperature value for an engine cylinder and an estimated total fuel amount for the engine cylinder. Engine actuator settings, including values indicative of an amount of fuel injected and the injection timing during the immediately previous combustion cycle, are also received. A temperature of the engine cylinder and a total amount of fuel during the current combustion cycle are then estimated based on the estimated performance information for the immediately previous combustion cycle and the actuator settings applied during the immediately previous combustion cycle. The estimated temperature and fuel amount for the current combustion cycle are filtered based, at least in part, on a difference between an estimated value indicative of combustion phasing and a measured value indicative of combustion phasing. The filtered estimated temperature and the filtered estimated fuel amount for the current combustion cycle are then stored to the memory to be used in estimating performance information for a subsequent combustion cycle.

Other aspects of the invention will become apparent by consideration of the detailed description and accompanying drawings.

BRIEF DESCRIPTION OF THE DRAWINGS

FIG. 3C is a graph illustrating the combustion phasing of an engine for each of a plurality of combustion cycles during HCCI combustion.

FIG. 3D is a graph illustrating the indicated mean effective pressure of an engine for each of a plurality of combustion cycles during HCCI combustion.

FIG. 4 is a flowchart of a method for predicting high cycle-to-cycle combustion variation and applying preventative measures to prevent the predicted high cycle-to-cycle combustion variation using the engine control system of FIG. 1.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
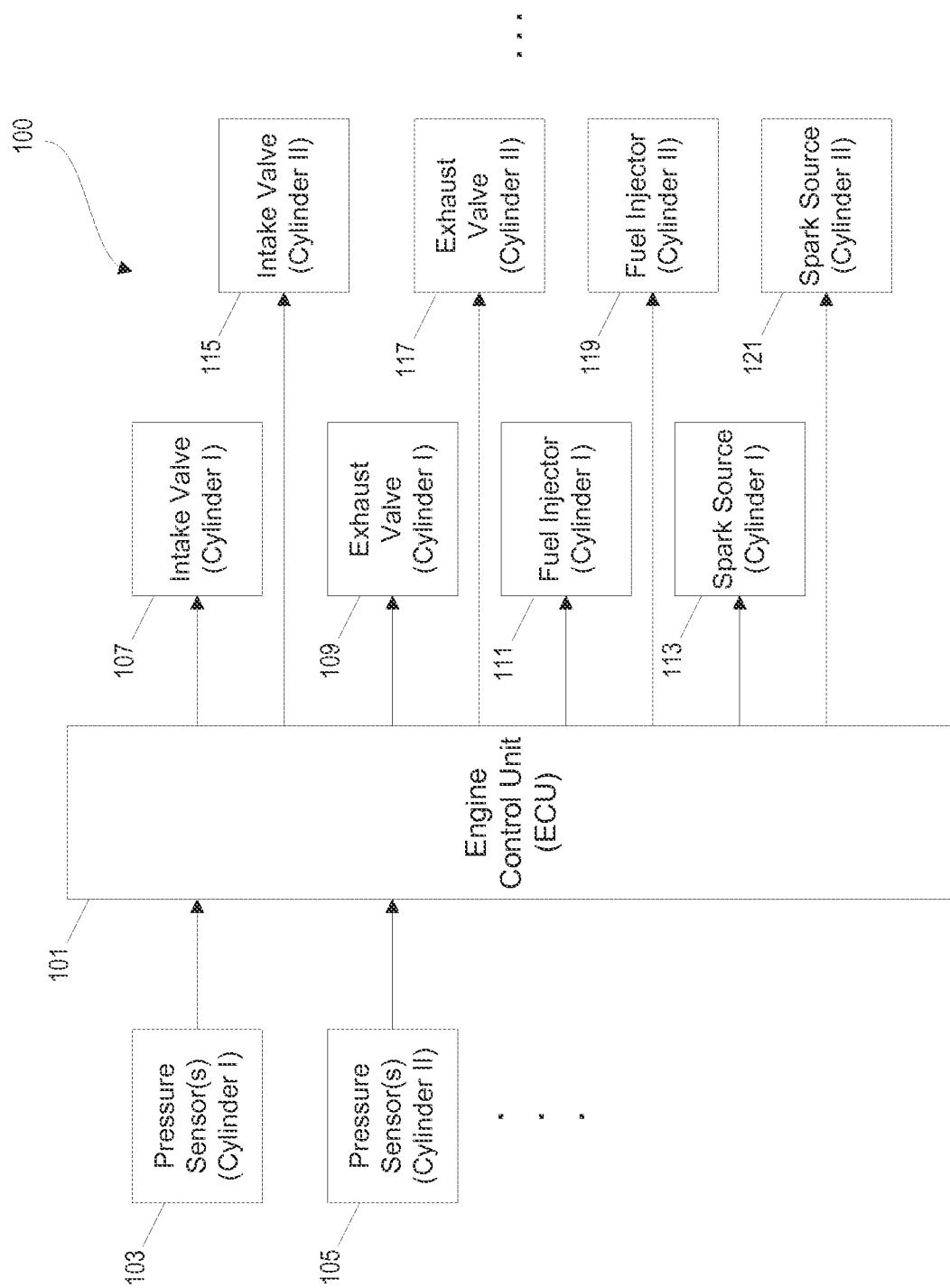
FIG. 1 is a block diagram of an engine control system according to one embodiment.

FIG. 1 illustrates a system 100 for controlling the operation of an internal combustion engine. As described in further detail below, the system is capable of operating the engine in various combustion modes including, for example, spark ignition, homogeneous charge compression ignition (HCCI), and spark-assisted compression ignition (SACI). The system includes an engine control unit 101 that includes a processor and memory. The memory stores instructions that are executed by the processor to cause the engine control unit 101 to perform various functional operations. The engine control unit 101 receives inputs from various sensors including one or more pressures sensors associated with each cylinder of the internal combustion engine 103, 105. The system 100 can also include other sensors that provide information regarding the status of the engine to the engine control unit 101 such as, for example, temperature sensors for the engine as a whole and temperature sensors associate with each individual cylinder.

Based on the combustion mode being implemented and, in some cases, the inputs received from the various engine sensors, the engine control unit 101 controls the operation of the engine by providing control signals to a plurality of actuators. For example, as illustrated in FIG. 1, the engine control unit 101 can control the intake valve 107, an exhaust valve 109, a fuel injector 111, and a spark source 113 in a specific engine cylinder. The engine control unit can also control the operation of an intake valve 115, exhaust valve 117, fuel injector 119, and spark source 121 for other cylinders in the engine.

Figure 2:
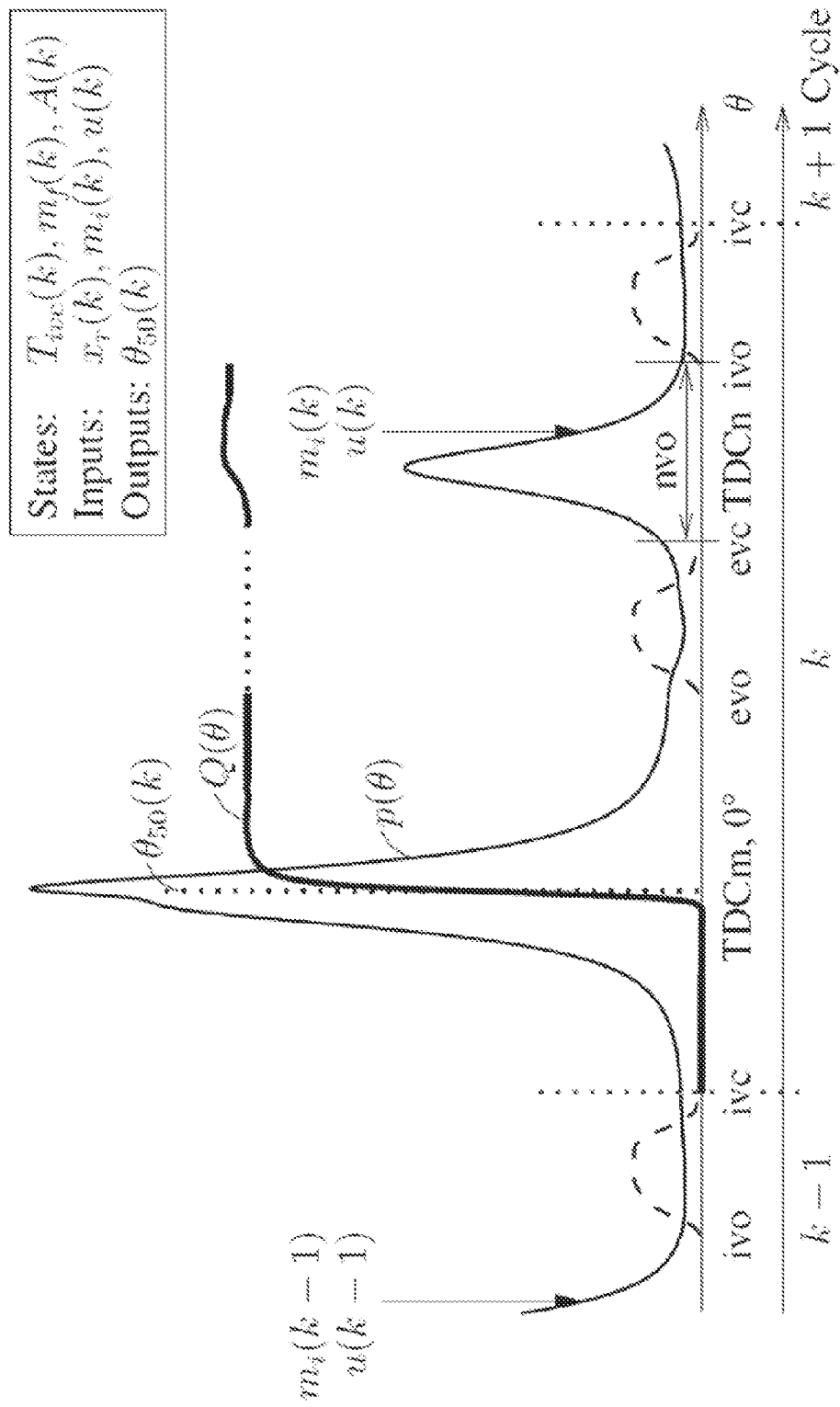
FIG. 2 is a graph of engine pressures and temperatures as a function of time during HCCI combustion.

FIG. 2 illustrates in further detail the operation of an engine during controlled autoignition—in particular, during an HCCI combustion mode. The lighter line indicates the pressure $p(\theta)$ in the engine cylinder as a function of time. The heavier line indicates the heat release $Q(\theta)$ in the engine cylinder. The illustrated combustion mode used negative valve overlap (NVO) to achieve HCCI combustion. In other words, there are two periods of time during each combustion cycle when both the exhaust valve and the intake valve are closed causing increases in the pressure inside the cylinder.

In the illustrated example, the intake valve is closed at ivc and the pressure begins to rise. The closing of the intake valve is timed to correspond with the compression of the gas in the cylinder by an engine piston. As the pressure increases, the fuel inside the engine combusts causing an increase in the heat release $Q(\theta)$ exhibited in the engine cylinder. The pressure decreases as the engine piston is forced downward and the exhaust valve is opened at evo.

When the exhaust valve is closed at evc, the pressure in the engine cylinder again begins to rise. It is during this period that a fuel mass $m_f(k)$ is injected into the engine cylinder. After a period of time, the intake valve is opened at ivo and closed again at ivc thereby beginning the next combustion cycle (k+1). FIG. 2 also illustrates the timing of the fuel injection during the previous combustion cycle at $m_f(k-1)$.

The engine system described above operates in one of a variety of combustion modes depending upon the operating conditions of the engine (e.g., engine torque, engine speed, etc.). If the engine is operating under conditions where HCCI combustion can be effectively applied, the engine control unit 101 operates the engine according to an HCCI combustion mode. However, in some operating conditions where HCCI combustion cannot be effectively applied, the engine control unit 101 will revert to standard spark ignition. This is because, without a spark to control the exact timing of ignition, the engine can exhibit high cycle-to-cycle combustion variation.

Figure 3A:
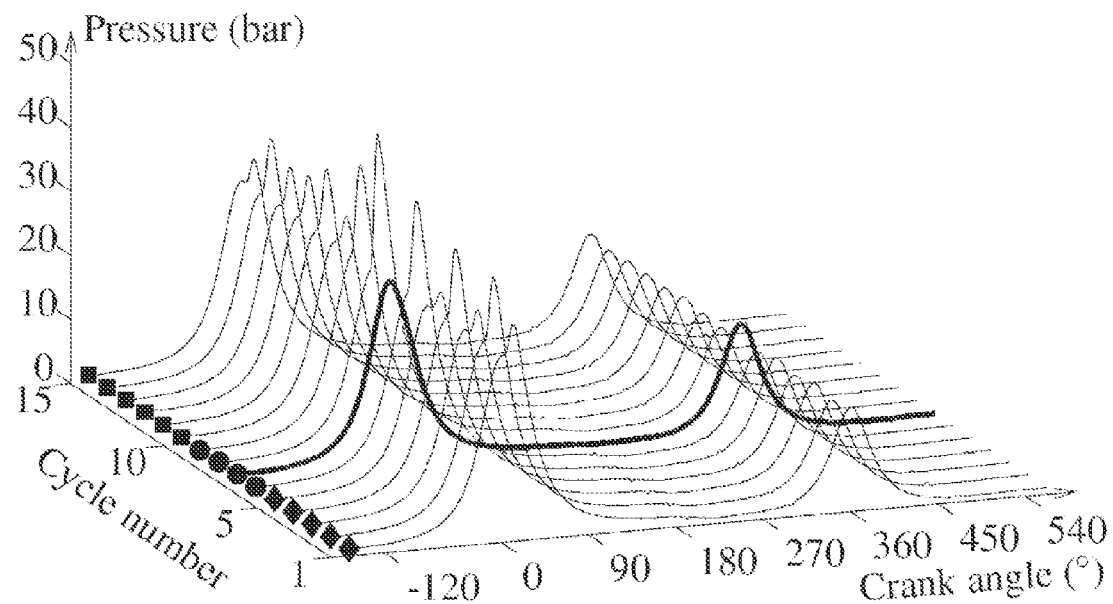
FIG. 3A is a graph of engine pressure as a function of crank angle for a plurality of combustion cycles during HCCI combustion.

FIG. 3A illustrates the pressure within the engine as a function of crank angle (or time) during HCCI operation. As illustrated by the heavier dark line, the pressure exhibited during cylinder compression in combustion cycle 5 is noticeably lower than the pressure exhibited at the same crank angle during other combustion cycles. Furthermore, the pressure in the cylinder at the time that fuel is injected is noticeably higher during combustion cycle 5. This is due in part to failure of the engine cylinder to ignite and burn all of the fuel mass present inside the engine cylinder during the combustion cycle. The amount of unburned fuel affects the performance of the engine and causes high cycle-to-cycle combustion variation.

Figure 3B:
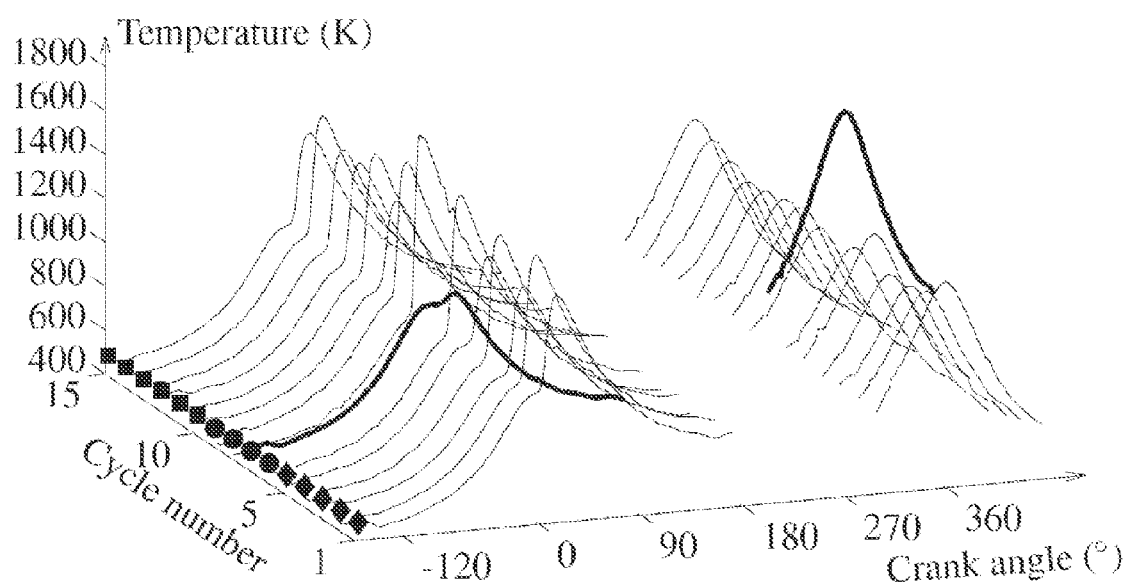
FIG. 3B is a graph of engine temperature as a function of crank angle for a plurality of combustion cycles during HCCI combustion.

As illustrated in FIG. 3B, temperature is also related to combustion variability in an engine cylinder. During the same combustion cycle 5, the temperature in the engine cylinder was significantly lower at the point of ignition. Subsequently, the temperature was much higher when the fuel for the next combustion cycle was injected.

These variations in temperature and the amount of unburned fuel affect subsequent combustion cycles in the engine cylinder. As illustrated in FIG. 3C, the combustion phasing of the engine during HCCI combustion exhibits a moderate oscillation between cycles. During combustion cycle 2, the combustion phasing is earlier than during combustion cycles 1 or 3. However, the misfire in the cylinder during combustion cycle 5 causes a significant advance in the combustion phasing during combustion cycle 6 and a significantly late combustion during cycle 7. Similarly, in FIG. 3D, the indicated mean effective pressure (IMEP) of the engine cylinder will exhibit a slight oscillation during normal HCCI combustion. However, the engine misfire during combustion cycle 5 causes a significant pressure drop that is observed during combustion cycle 7.

Effective operation of an internal combustion engine requires consistent performance and minimal engine misfires. As such, an engine could be configured to reduce the operating range in which HCCI combustion is applied. As such, HCCI combustion is only applied under operating conditions where high cycle-to-cycle combustion variation is unlikely. However, reducing the operating ranges eliminates some of the benefits of operating in HCCI.

FIG. 4 illustrates a method of predicting high cycle-to-cycle combustion variation and applying corrective measures to prevent misfire conditions from occurring. The engine control unit 101 receives engine data (e.g., pressure measurements) from the various engine sensors (step 401). The engine control unit 101 then calculates performance indicators for combustion stability such as, for example, engine torque and engine speed (step 403). The engine control unit also applies a dynamic estimator to estimate the current combustion states of the engine based on more limited data received from the sensors (step 405). The dynamic estimator is described in further detail below in reference to FIGS. 5A and 5B.

The engine control unit 101 then determines, based on the performance indicators, whether the engine in an operating region where spark ignition should be applied (step 407). If so, the engine control unit 101 controls the engine actuators based on a spark ignition control protocol (step 409). If not, the engine control unit 101 determines whether the engine is operating under conditions where HCCI combustion can be applied without a substantial risk of cycle-to-cycle combustion variation (i.e., a "stable" HCCI region) (step 411). If the performance indicators indicate that HCCI combustion can be applied with low risk of cyclic variability, the engine control unit 101 controls the engine actuators based on an HCCI control protocol without cyclic variability (CV) prediction (Step 413). Examples of fueling and control strategies for operating an internal combustion engine in an HCCI combustion mode are described in further detail in U.S. patent application Ser. No. 13/621,433 and Ser. No. 13/621,425, both filed on Sep. 14, 2012, the entire contents of both of which are incorporated herein by reference.

If, however, the engine performance indicators indicate that the engine is currently under operating conditions where spark ignition is not necessary, but cyclic variability is more likely if HCCI combustion is applied, the engine control unit 101 implements a predictive algorithm for detecting and correcting conditions that may cause high cyclic variability. First, the engine control unit 101 determines whether injection timing alone has significant control authority to control combustion variability (step 415). In other words, the engine control unit 101 determines whether the engine conditions such that combustion variability can be prevented simply by adjusting the fuel injection timing. In some cases, this determination is based solely on the engine configuration and hardware (i.e., injection timing either always has sufficient control authority or always lacks sufficient control authority regardless of the operating conditions of the vehicle). In other cases, whether injection timing has sufficient control authority is determined based on the current operating conditions (i.e., the performance indicators) of the engine. In any case, the factors applied to make this determination are engine specific and the engine control unit 101 is calibrated accordingly.

If injection timing does have sufficient control authority to prevent cyclic variability (step 415), the engine control unit 101 applies a predictive model to determine whether high cyclic variability is likely to be exhibited in upcoming combustion cycles based, at least in part, on the current combustion state of the engine (step 417). The predictive model applied by the engine control unit 101 is described in further detail below. Based on the output of the predictive model, the engine control unit 101 adjusts the fuel injection timing for the engine cylinder to stabilize combustion and prevent any predicted high cycle-to-cycle combustion variation (step 419).

Similarly, if the engine conditions are such that injection timing alone does not have sufficient control authority to regulate combustion variation, the engine control unit 101 also applies a predictive model to determine whether high cyclic variability is likely to be exhibited in upcoming cycles (step 421). The engine control unit 101 then adjusts both the fuel injection timing and the fuel injection quantity to stabilize combustion and reduce any predicted high cycle-to-cycle combustion variation (step 423). In some constructions, the predictive model applied at step 421 is the same as the predictive model applied at step 417. However, in some constructions, the model applied may be different in order to provide more specific information which can be used by the engine control unit 101 to stabilize combustion by adjusting both fuel injection timing and fuel injection quantity.

The predictive model captures the recycling of the thermal and chemical energy in the residual gas of the cylinder, and the effect of injection timing on the combustion phasing. Three states are utilized, which are defined at the beginning of the combustion cycle k. These are the temperature at intake valve closing $T_{ivc}(k)$, the fuel amount $m_f(k)$, and the ignition scaling A. The model takes into account that combustion efficiency varies with combustion phasing and that heat release can occur during both closed portions of the cycle.

The inputs to the model are the residual gas fraction $x_r(k)$, the injected fuel mass $m_i(k)$, and the crank angle of the injection u(k). The residual gas fraction $x_r$ is mainly regulated by controlling the negative valve overlap (nvo) (i.e., the valve timing). With cam phasing mechanisms, this control is on a considerably slower time scale than that of an engine combustion cycle. The injected fuel amount $m_i$ is typically used to track the desired load from the driver. Control of $x_r$ and $m_i$ is thus limited by slow actuation and the requirement of tracking the desired load. Therefore, the input $x_r(k)$ is treated as an exogenous signal and the injection timing u is selected as the main actuator. However, manipulating $m_i$ on a per-cycle basis is possible and is beneficial if the authority of u is exhausted (e.g., steps 421 and 423 of FIG. 4).

The states, inputs, and outputs for the predictive model described below are illustrated in FIG. 1. Table 1 defines the symbols used for intermediate variables and the definitions for all the parameters of the model.

TABLE 1

| Symbol | Description |
|---|---|
| evo, evc | Exhaust valve opening/closing |
| ivo, ivc | Intake valve opening/closing |
| nvo | Negative valve overlap (evc-ivo) |
| $\eta_m$ | Combustion efficiency for the main period (ivc-evo) |
| $\theta$ | Crank angle |
| $\theta_x$ | Crank angle for valve event x (ivo, ivc, evo, or evc) |
| $\theta_{soc}$ | Crank angle for start of combustion |
| $\theta_m$ | Crank angle for end of combustion |
| $\Delta\theta$ | Burn duration |
| $\kappa$ | Knock-integral |
| $\tau$ | Ignition delay |
| k | Combustion cycle index |
| p | In-cylinder pressure |
| T | In-cylinder gas temperature |
| $T_r$ | Residual gas temperature, $T(\theta_{ivo})$ |
| V | Cylinder volume |

Table 2 provides the model parameters divided into five groups: (1) quantities known by design or measurement, (2) ignition delay and burn duration characteristics, (3) lump parameters for the temperature dynamics, (4) efficiency parameters, and (5) injection timing parameters.

TABLE 2

| Symbol | Parameter |
|---|---|
| $\omega$ | Engine speed |
| ivc | Intake valve closing |
| $p_{ivc}$ | Pressure at ivc |
| $T_{im}$ | Intake temperature |
| $r_c$ | Compression ratio |
| b | Bore |
| a | Crank radius |
| l | Connecting rod length |
| B | Ignition delay temperature factor |
| n | Ignition delay pressure exponent |
| $d_0$ | Burn duration scaling |
| $d_1$ | Burn duration shift |
| $d_2$ | Burn duration slope |
| $\alpha$ | Breathing parameter |
| $\beta$ | Temperature rise factor, main comb. |
| $\gamma$ | Polytropic exponent |
| $\zeta$ | Temperature rise factor, nvo comb. |
| $e_1$ | Scaling, main comb. efficiency |
| $e_2$ | Shift, main comb. efficiency |
| $e_3$ | Slope, main comb. efficiency |
| $\eta_n$ | Efficiency for nvo comb. |
| $s_0$ | Injection offset parameter |
| $s_1$ | Injection scaling parameter |
| $s_2$ | Injection slope parameter |

The structure of the complete model is given by the following equations:

$$\begin{cases} T_{ivc}(k+1) = f_1(x(k), x_r(k)) \\ m_f(k+1) = f_2(x(k), x_r(k), m_i(k)) \\ A(k+1) = f_3(u(k)) \end{cases} \quad (1)$$

wherein $x(k) = (T_{ivc}(k), m_f(k), A(k))$ is a state vector.

The temperature dynamics $f_1$ are defined as $$T_{ivc}(k+1)=(1-x_r(k))T_{im}+x_r(k)T_r(k) \qquad (2)$$

where the gas temperature at intake valve opening $T_r(k)$ is $$T_r(k) = \left\{\alpha[1+\beta\eta_m(\theta_m)m_f(k)V(\theta_m)^{\gamma-1}]^{\frac{1}{\gamma}} + \zeta m_f(k)(1-\eta_m(\theta_m))\right\}T_{ivc}(k) \qquad (3)$$

where ($\alpha$, $\beta$, $\zeta$) are lumped parameters and the volume is given later in Eq. (10). The combustion efficiency $\eta_m(\theta_m)$ is modeled by $$\eta_m(\theta_m) = e_1\left(1+\exp\frac{\theta_m-e_2}{e_3}\right)^{-1}, \qquad (4)$$

with parameters ($e_1$, $e_2$, $e_3$). The end of main combustion is defined by the ignition model of Eq. (8)-(12) given below.

The fuel dynamics $f_2$ are given by $$m_f(k+1)=m_i(k)+x_r(1-\eta_m(\theta_m))(1-\eta_n)m_f(k) \qquad (5)$$

where $\eta_n$ is the combustion efficiency during nvo, which is assumed constant. The influence of the injection timing u(k) on the ignition in the following combustion cycle is modeled by the following relationship between u(k) and the pre-exponential factor A, $$A(k+1) = s_0 + s_1\left(1+\exp\frac{u(k)}{s_2}\right)^{-1} \qquad (6)$$

with the parameters ($s_0$, $s_1$, $s_2$) and where the injection timing u(k) is given in crank angle degrees.

The output from the model is the combustion phasing, the 50% burn angle denoted by $\theta_{50}$, and is approximated to occur after half the burn duration $\Delta\theta$, $$\theta_{50}(k)=\theta_{soc}+\Delta\theta/2 \qquad (7)$$

The crank angle timing of the main combustion $\theta_m$ is given by an Arrhenius expression whereas the timing for the combustion during re-compression is constant. The ignition delay for the main combustion is given by $$\tau=A(u)p(\theta)^n\exp(B/T(\theta)) \qquad (8)$$

where A(u) is the state capturing the effect of injection timing u, and (B, n) are constant tuning parameters. The pressure $p(\theta)$ and the temperature $T(\theta)$ are given by polytropic processes, $$p(\theta) = p_{ivc}\left(\frac{V(\theta_{ivc})}{V(\theta)}\right)^\gamma \qquad (9a)$$

$$T(\theta) = T_{ivc}\left(\frac{V(\theta_{ivc})}{V(\theta)}\right)^{\gamma-1} \qquad (9b)$$

where $V(\theta)$ is the cylinder volume, $p_{ivc}$ is the cylinder pressure at intake valve closing (ivc), $\theta_{ivc}$ is the crank angle at intake valve closing, and $\gamma$ is a tuned polytropic exponent. The volume V is given by $$V = \frac{\pi a b^2}{4}\left(1+l/a+\frac{2}{r_c-1}-\cos\theta-\sqrt{(l/a)^2-\sin^2\theta}\right) \qquad (10)$$

The start of combustion $\theta_{soc}$ is modeled by a "knock-integral" approach and given by $\theta_{soc}=k^{-1}$ where $$\kappa(\theta_{soc}, A) = \int_{\theta_{ivc}}^{\theta_{soc}}\frac{dt}{\tau}, dt = d\theta/\omega \qquad (11)$$

and $\omega$ is the engine speed. The end of main combustion $\theta_m$ is given by $$\theta_m = \theta_{soc}+\Delta\theta, \Delta\theta = d_0\exp\frac{\theta_{soc}-d_1}{d_2} \qquad (12)$$

where $\Delta\theta$ is the burn duration and ($d_0$, $d_1$, $d_2$) are tuned parameters.

Figure 5A:
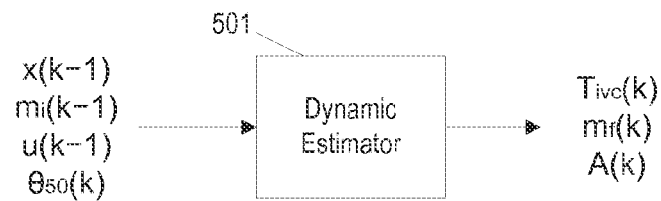
FIG. 5A is a functional block-diagram of a dynamic estimator for use in the method of FIG. 4.

FIG. 5A illustrates the inputs and outputs of the dynamic estimator 501 referred to in FIG. 4. The dynamic estimator receives the state vector x(k−1) indicating the engine state during the immediately prior combustion cycle. The state vector includes the temperature at intake valve closing $T_{ivc}$ and the amount of fuel in the cylinder $m_f$ during the previous combustion cycle. The dynamic estimator also receives the value of the amount of fuel injected during the previous cycle $m_i$(k−1), the injection timing during the previous cycle u(k−1), and the current combustion phasing $\theta_{50}$ (i.e., the crank angle of the engine at approximately halfway through the burn duration of the combustion cycle). Based on this information, the dynamic estimator is configured to estimate a temperature at intake valve close $T_{ivc}$, a total amount of fuel in the cylinder $m_f$, and an ignition scaling value A for the current combustion cycle.

Figure 5B:
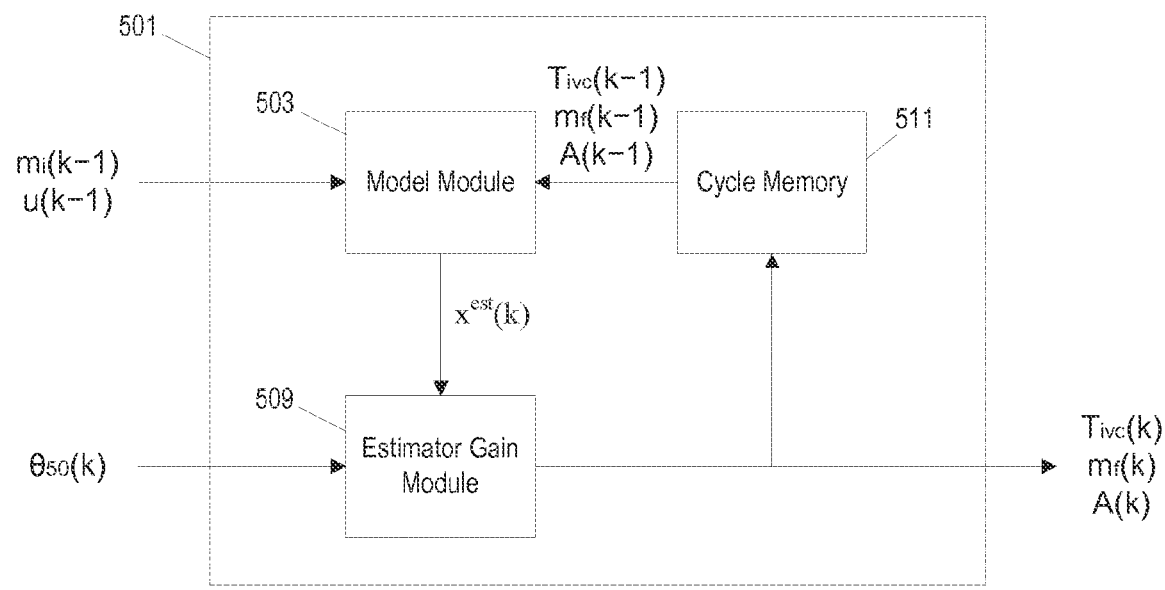
FIG. 5B is a flowchart illustrating the operational details of the dynamic estimator illustrated in FIG. 5A.

FIG. 5B illustrates the functions of the dynamic estimator in further detail. The state vector x(k−1) calculated by the dynamic estimator during the previous combustion cycle are retrieved from memory and applied to a model. The model 503 of the dynamic estimator 501 applies the same equations used in the predictive model described above (Eq. (1)-(7)). However, instead of predicting future combustion behavior based on current combustion states, the dynamic estimator determines current combustion states based on previous combustion behavior. The dynamic estimator processes the modeling equations using the state vector x(k−1) accessed from memory, the fuel amount that was actually injected during the previous combustion cycle $m_i$(k−1), and the injection timing that was actually applied during the previous combustion cycle u(k−1).

After preliminary estimated values for the current state vector x(k) (including the temperature at intake valve closing $T_{ivc}$(k), the amount of fuel in the cylinder $m_f$(k), and the ignition scaling value A(k)) are calculated, the dynamic estimator uses an estimator gain module 509 to filter the output of the model module 503 based in part on the combustion phasing $\theta_{50}$ and to calculate the final output values of the current state vector. The output values are calculated by $$x(k)=x^{est}(k)+K(\theta_{50}(k)-h(k)) \qquad (13)$$

where $x^{est}$(k) is the state vector as estimated by the model module 503, and K is an estimator gain parameter. In some constructions, the estimator gain parameter K is a constant value determined by engine calibration. However, in some cases, the value of K is determined based on environmental and engine operating characteristics such as, for example, engine noise. The combustion phasing variable $\theta_{50}$ is measured by sensors on the engine and provided to the estimator gain module 509. The parameter h is an estimated value of the combustion phasing variable as calculated by equation (7) above.

The final output values from the estimator gain module 509 is output from the dynamic estimator 501 and used by other modules of the engine control unit 101, such as, for example, the predictive model described above. The final output values of x(k) are also stored to a memory 511 and used by the dynamic estimator 501 to estimate combustion states during the next combustion cycle (k+1).

Thus, the invention provides, among other things, methods and systems for detecting conditions that may lead to high cycle-to-cycle combustion variation and for applying corrective measures to prevent high cyclic variation. The invention also provides methods and systems for estimating the current combustion states of an internal combustion engine based on fuel injection timing and fuel injection amount as well as the estimated combustion states for the immediately prior combustion cycle. Various features and advantages of the invention are set forth in the following claims.

What is claimed is:

1. A method of estimating performance information for a combustion cycle of an internal combustion engine, the internal combustion engine including a pressure sensor, a temperature sensor, an engine control unit, the engine control unit having a processor and a memory, and a cylinder having an intake valve, an exhaust valve, a fuel injector, and a spark source, the method comprising:
    retrieving from the memory of the engine control unit estimated performance information for a previous combustion cycle, the estimated performance information including a temperature value and a fuel amount;
    receiving via the engine control unit, engine actuator settings for the previous combustion cycle, the engine actuator settings including a value of at least one engine actuator setting applied to at least one of the group consisting of the intake valve, the exhaust valve, the fuel injector, and the spark source;
    estimating via the engine control unit, the performance information for the current combustion cycle based, at least in part, on the estimated performance information for the previous combustion cycle and the engine actuator settings for the previous combustion cycle; and
    storing the estimated performance information for the current combustion cycle to the memory of the engine control unit to be used in estimating performance information for a subsequent combustion cycle.

2. The method of claim 1, wherein the performance information estimated for the current combustion cycle includes new values for the same at least one engine performance variable included in the estimated performance information for the previous combustion cycle accessed from the memory.

3. The method of claim 1, wherein the engine actuator settings are determined by an engine control unit and transmitted to the at least one engine actuator to control operation of the engine.

4. The method of claim 1, wherein the engine actuator settings includes a value of an amount of fuel injected into a cylinder of the engine during the previous combustion cycle and a value indicative of injection timing for the cylinder of the engine during the previous combustion cycle.

5. The method of claim 1, wherein the estimated performance information for the previous combustion cycle includes estimated performance information for a combustion cycle immediately preceding the current combustion cycle.

6. The method of claim 1, further comprising:
    retrieving from the memory the estimated performance information for the current combustion cycle;
    receiving engine actuator settings for the current combustion cycle;
    estimating performance information for a subsequent combustion cycle based, at least in part on the estimated performance information for the current combustion cycle and the engine actuator settings for the current combustion cycle.

7. The method of claim 1, further comprising filtering the estimated performance information for the current combustion cycle before storing the estimated performance information for the current combustion cycle to the memory.

8. The method of claim 7, wherein the estimated performance information for the current combustion cycle is filtered based, at least in part, on a value of a measured performance variable for the current combustion cycle received from an engine sensor.

9. The method of claim 8, wherein the measured performance variable is not one of the engine performance variables included in the estimated engine performance information retrieved from the memory.

10. The method of claim 8, wherein the measured performance information includes a value indicative of combustion phasing.

11. The method of claim 8, wherein the estimated performance information for the current combustion cycle includes an estimated value of the measured performance variable, and further comprising filtering the estimated performance information for the current combustion cycle based, at least in part, on a difference between the estimated value of the measured performance variable and the measured value of the measured engine performance.

12. A method of estimating performance information for a current combustion cycle of an internal combustion engine, the internal combustion engine including an a pressure sensor, a temperature sensor, an engine control unit, the engine control unit having a processor and a memory, and a cylinder having an intake valve, an exhaust valve, a fuel injector, a spark source, the method comprising:
    retrieving from the memory of the engine control unit estimated performance information for an immediately previous combustion cycle, the estimated performance information including an estimated value of a temperature determined by the temperature sensor for the engine cylinder during the immediately previous combustion cycle and an estimated value of a total amount of fuel present in the engine cylinder during the immediately previous combustion cycle;
    receiving via the engine control unit, engine actuator settings for the immediately previous combustion cycle, the engine actuator settings including a value indicative of an amount of fuel injected into the engine cylinder during the immediately previous combustion cycle and a value indicative of fuel injection timing for the engine cylinder during the immediately previous combustion cycle;

estimating via the engine control unit, a temperature of the engine cylinder during the current combustion cycle and a total amount of fuel present in the engine cylinder during the current combustion cycle based, at least in part, on the estimated performance information for the immediately previous combustion cycle and the engine actuator settings for the immediately previous combustion cycle;

calculating via the engine control unit, an estimated value indicative of combustion phasing for the current combustion cycle;

receiving via the engine control unit, a measured value indicative of combustion phasing from an engine sensor;

filtering via the engine control unit, the estimated temperature of the engine cylinder during the current combustion cycle and the total amount of fuel present in the engine cylinder during the current combustion cycle based, at least in part, on a difference between the estimated value indicative of combustion phasing and the measured value indicative of combustion phasing; and storing the filtered estimated temperature of the engine cylinder during the current combustion cycle and the filtered estimated total amount of fuel present in the engine cylinder during the current combustion cycle to the memory of the engine control unit to be used in estimating performance information for a subsequent combustion cycle.

13. An internal combustion engine comprising:
a pressure sensor;
a temperature sensor;
a first cylinder, the first cylinder including
    an intake valve,
    an exhaust valve,
    a fuel injector,
    a spark source, and
an engine control unit, the engine control unit including
    a memory, and
    a processor,
wherein estimated performance information for a previous combustion cycle is retrieved from the memory of the engine control unit, the estimated performance information including a temperature value and a fuel amount,
wherein the engine control unit receives engine actuator settings for the previous combustion cycle, the engine actuator settings including a value of at least one engine actuator setting applied to at least one the group consisting of the intake valve, the exhaust valve, the fuel injector, and the spark source,
wherein the engine control unit estimates the performance information for the current combustion cycle based, at least in part, on the estimated performance information for the previous combustion cycle and the engine actuator settings for the previous combustion cycle, and
wherein the estimated performance information for the current combustion cycle is stored to the memory to be used in estimating information for a subsequent combustion cycle.

* * * * *